United States Patent Office 2,978,455
Patented Apr. 4, 1961

2,978,455
ESTERS OF 2,2,4,4-TETRANITROBUTANOL

Milton B. Frankel, Pasadena, Calif., assignor to Aerojet-General Corporation, Azusa, Calif., a corporation of Ohio No Drawing. Filed Oct. 22, 1956, Ser. No. 617,667

14 Claims. (Cl. 260—295)

This invention relates to new compositions of matter and specifically to esters of 2,2,4,4-tetranitrobutanol and enol salts of esters of 2,2,4,4-tetranitrobutanol, and has for its object, the formation of esters of 2,2,4,4-tetranitrobutanol and derivatives thereof.

A related object of the invention is to provide a new process for the preparation of esters of 2,2,4,4-tetranitrobutanol from esters of 2-bromo-2,2-dinitroethanol.

This application is a continuation-in-part of my co-pending application Serial No. 407,141, filed January 29, 1954, now abandoned.

The compositions of this invention find valuable use as explosives and as plasticizers for polymeric resins and plastics. The esters of 2,2,4,4-tetranitrobutanol are highly sensitive compositions. Certain of the metal salts thereof find important use as primary explosives having a sensitivity of the order of mercury fulminate.

These compositions also find valuable use as intermediates in the production of alcohols and acids which are useful as components of propellant fuels. Both the free esters and the salts of this invention will readily react with formaldehyde to form their corresponding alcohols. Similarly, both the salts and the free esters will also condense with an alkenoic acid ester in basic solution to yield the corresponding acids.

It is well known in the art that compounds containing a bromodinitromethyl group will react quantitatively with an iodide salt, such as sodium and potassium iodide, to liberate free iodine in quantities molecularly equivalent to the amount of bromine in the molecules. This is normally illustrated by the following equation:

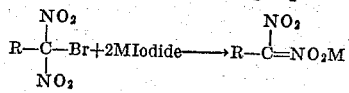

where R is any organic radical and M is any cation that forms an iodide soluble in either water or an organic solvent. The preferred iodides are those of sodium, ammonium, potassium, lithium, calcium, strontium, magnesium, barium and aluminum.

It should be expected from the prior art that when an ester of 2-bromo-2,2-dinitroethanol is treated with an iodide salt, one should expect the formation of free iodine and an aci-salt of an ester of 2,2-dinitroethanol in accordance with the general reaction scheme set forth above; however, I have discovered that the reaction does not occur in the anticipated manner and that a new and totally unexpected product is obtained. According to my discovery, the expected aci-salt of the ester of 2,2-dinitroethanol is not formed as an end product, but instead, the aci-salt of an ester of 2,2,4,4-tetranitrobutanol is obtained, in accordance with the general reaction scheme set forth below:

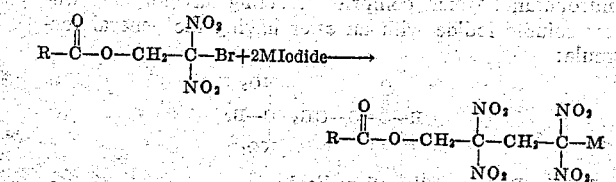

wherein R and M are as defined above.

The esters of dinitroethanol which are operable in these reactions are not limited to any specific types, hence R may be any alkyl, alkenyl, aryl, alkaryl, cycloalkyl or heterocyclic group. The esters may be formates, acetates, propionates, butyrates, benzoates, toluates, phthalates, naphthalates, phenylacetates, oleates, pyrolecarboxylates, picolinates, cyclohexylcarboxylates, cyclohexylacetates, etc.

Examples of the manner in which the reactions occur are set forth by the following specific examples:

*Formation of 2-bromo-2,2-dinitroethyl acetate*

A 3-necked flask provided with a stirrer, thermometer, and dropping funnel is charged with 215 grams of damp potassium 2,2-dinitroethanol (equivalent to one mole of dry salt) and 500 ml. of water. The yellow slurry that is formed is cooled to 0° C., and 176 grams (1.1 mole) of bromine is added during a forty minute period. The reaction mixture is extracted with several portions of ether. The ether extracts are combined, washed twice with water, and dried over sodium sulfate at 0° C. The ether solution is concentrated and distilled at between 88°–93° C. under 2 mm. pressure. The distillate, 2-bromo-2,2-dinitroethanol, is a white mushy solid which becomes liquid on contact with moist air. The 2-bromo-2,2-dinitroethanol is reacted immediately with a solution of 86 grams (1.1 mole) of acetyl chloride dissolved in 500 ml. of dry chloroform. The solution is refluxed for 3.5 hours to allow complete reaction. The solvent is removed under reduced pressure leaving a light yellow liquid which is distilled at between 86°–95° C. under 3 mm. of pressure. A 75% yield (193.4 grams) of 2-bromo-2,2-dinitroethyl acetate was produced. This compound has a refractive index of $n_D^{22}$ 1.4760. The theoretical percentage of nitrogen is 10.90. On ultimate analysis the bromine content of the compound was found to be 30.96 and the nitrogen content was 10.59.

*Formation of potassium 2,2,4,4-tetranitrobutyl acetate*

A 3-necked flask provided with a mechanical stirrer and dropping funnel is charged with 514 grams (2 moles) of 2-bromo-2,2-dinitroethyl acetate dissolved in 2 liters of methanol. The solution is cooled to 0° and a solution of 1660 grams (10 moles) of potassium iodide in 3000 ml. of aqueous methanol, preferably 50% methanol, is added. The purple reaction mixture is filtered and a canary yellow solid separates out. The yellow solid is washed with ether until free of iodine. The yellow solid thus formed is potassium 2,2,4,4-tetranitrobutyl acetate. The yield obtained by this method is equivalent to 377 grams. The compound indicated a melting point of 174° C., however, this temperature is only approximate, since the compound exploded at substantially the melting temperature. The product may be purified by recrystallizing it from water, the potassium salts of the compound being substantially insoluble in water. The theoretical composition of $C_6H_7N_4O_{10}K$ is:

%C, 21.56; %H, 2.11; %N, 16.76

The components determined by ultimate analysis showed:

%C, 21.89; %H, 2.27; %N, 16.67

*Formation of 2,2,4,4-tetranitrobutyl acetate*

In a 3-necked flask fitted with a mechanical stirrer, thermometer and dropping funnel are placed 120 grams (0.34 mole) of potassium 2,2,4,4-tetranitrobutyl acetate in 1500 ml. of water. The suspension is cooled to 0° and a solution of 50 ml. of sulfuric acid and 300 ml. of water is added carefully. At the end of the addition the reaction mixture will turn from orange to yellow. Stirring is continued for another hour to insure complete reaction and the mixture is filtered. The creamy colored solid which is collected on the filter is washed well with water and air dried. The yield of 2,2,4,4-tetranitrobutyl acetate is 70.0 grams (67.5%) yield. The reaction involved is as follows:

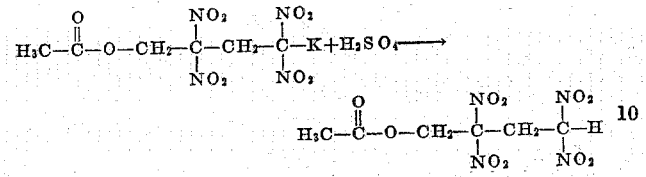

The product is recrystallized twice from ethyl chloride and gives a crystalline white solid which has a melting point of 58–59° C. The theoretical percentages of the elements in the compound $C_6H_8N_4O_{10}$ are:

%C, 24.33; %H, 2.72; %N, 18.92

An ultimate analysis gave the following results:

%C, 24.62; %H, 2.89; %N, 18.50

By substituting any other acid halide for the acetyl chloride used in the preparation of 2-bromo-2,2-dinitroethyl acetate in the above examples, for example, the alkanoic halides such as propionyl chloride, n-butyryl bromide, n-valeryl chloride, n-capronyl chloride, etc.; the alkenoic acid chlorides such as acrylyl chloride, fumaryl chloride, oleyl chloride, etc.; the aromatic acid chlorides such as benzoyl chloride, toluyl chloride, phthalyl chloride, cinnamyl chloride, naphthalyl chloride; the heterocyclic acid chlorides such as furanyl chloride, pyrrole α carboxylic acid chloride, picolinyl chloride, nicotinyl acid chloride, etc.; the cycloalkyl acid chlorides such as hexahydrobenzoyl chloride; the corresponding tetranitrobutyl esters and the salts thereof, namely, 2,2,4,4-tetranitrobutyl propionate, n-butyrate, n-valerate, n-capronate, acrylate, fumarate, oleate, benzoate, toluate, phthalate, cinnamate, naphthalate, furanate, pyrrole α carboxylate, picolynate, nicotinylate and hexahydrobenzoate, respectively, will be obtained by proceeding in the manner disclosed in the above examples, the acid portion of the composition being dependent upon the particular starting material used. It will be appreciated that in the case of dibasic acid halides such as phthalyl chloride, a di-ester will be obtained.

The nitro compounds of this invention are useful as high explosives and can be used in any conventional explosive missile, projectile, rocket, or the like, as the main explosive charge. An example of such a missile is disclosed in United States Patent No. 2,470,162, issued May 17, 1949. One way of using the high explosives of this invention in a device such as that disclosed in United States Patent No. 2,470,162, is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time fuse-mechanism firing a detonating explosive such as lead azide or mercury fulminate.

I claim:

1. As new compositions of matter, the salts of esters of 2,2,4,4-tetranitrobutanol having the general formula:

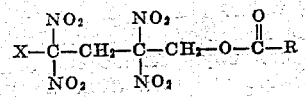

wherein R is a lower alkyl radical and X is an alkali metal radical.

2. As new compositions of matter, the esters of 2,2,4,4-tetranitrobutanol having the general formula:

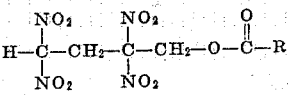

wherein R is a lower alkyl radical.

3. As new compositions of matter, the esters of 2,2,4,4-tetranitrobutanol having the general formula:

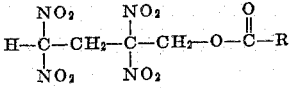

wherein R is an alkenyl radical.

4. As new compositions of matter, the esters of 2,2,4,4-tetranitrobutanol having the general formula:

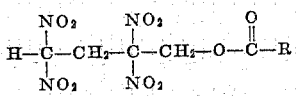

wherein R is an aryl hydrocarbon radical.

5. As new compositions of matter, the esters of 2,2,4,4-tetranitrobutanol having the general formula:

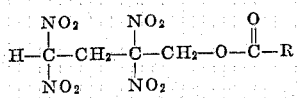

wherein R is a heterocyclic radical.

6. As a new composition of matter, 2,2,4,4-tetranitrobutyl acetate having the structural formula:

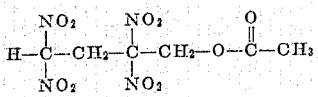

7. As a new composition of matter, potassium tetranitrobutyl acetate having the structural formula:

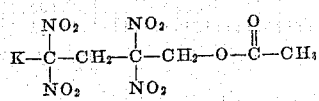

8. The method of preparing esters of 2,2,4,4-tetranitrobutanol which comprises reacting an inorganic water soluble iodide with an ester having the general formula:

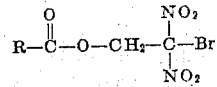

wherein R is a radical selected from the group consisting of a lower alkyl, alkenyl, arylalkyl, alkylaryl, aromatic hydrocarbon, cycloalkyl, and heterocyclic radicals.

9. The method of preparing esters of 2,2,4,4-tetranitrobutanol which comprises reacting an inorganic water soluble iodide with an ester having the general formula:

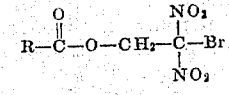

wherein R is a lower alkyl radical.

10. The method of preparing esters of 2,2,4,4-tetranitrobutanol which comprises reacting an inorganic water soluble iodide with an ester having the general formula:

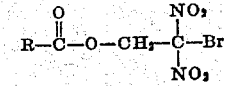

wherein R is an alkenyl radical.

11. The method of preparing 2,2,4,4-tetranitrobutyl acetate which comprises reacting 2-bromo-2,2-dinitroethyl acetate with potassium iodide.

12. The method of preparing 2,2,4,4-tetranitrobutyl acetate which comprises reacting 2-bromo-2,2-dinitroethyl acetate with an alkali metal iodide and subsequenly neutralizing the resultant metal salt with a strong mineral acid.

13. The method of preparing 2,2,4,4-tetranitrobutyl acetate which comprises reacting 2-bromo-2,2-dinitroethyl acetate with potassium iodide and subsequently neutralizing the resultant metal salt with sulfuric acid.

14. As new compositions of matter, compounds selected from the group consisting of 2,2,4,4-tetranitrobutyl esters and salts thereof having the general formula:

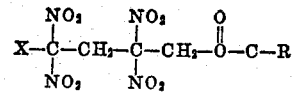

wherein X is a radical selected from the group consisting of hydrogen, ammonium and metals which are capable of forming water soluble iodides, and R is a radical selected from the group consisting of lower alkyl, alkenyl, aromatic hydrocarbon, arylalkyl, alkylaryl, cycloalkyl, and heterocyclic radicals.

References Cited in the file of this patent

B.I.O.S. Final Report No. 709, item No. 22. The Production of Tetranitromethane and Nitroform. Reported by W. Hunter, July 3, 1946. Page 8.